May 21, 1940.  J. P. PUTNAM  2,201,453

VARIABLE INDUCTOR

Filed Sept. 3, 1938

INVENTOR:
John P. Putnam
Dike, Calver + Gray
Attys.

Patented May 21, 1940

2,201,453

UNITED STATES PATENT OFFICE 2,201,453

VARIABLE INDUCTOR

John P. Putnam, Boston, Mass., assignor to The Reece Button Hole Machine Company, Boston, Mass., a corporation of Maine Application September 3, 1938, Serial No. 228,265

6 Claims. (Cl. 171—119)

This invention relates to variable inductors which are particularly adapted, though not limited, to tuning units for radio receivers of the "all-wave" type.

It is the primary aim and object of the present invention to increase the ratio between the maximum and minimum inductance of a variable inductor or "variometer" to an extent heretofore impossible.

This object is accomplished by mounting the inductively related windings or coils of the variometer on relatively rotatable elements of ferromagnetic material which are, moreover, so coordinated that they form a substantially closed magnetic field of very small and substantially constant reluctance.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
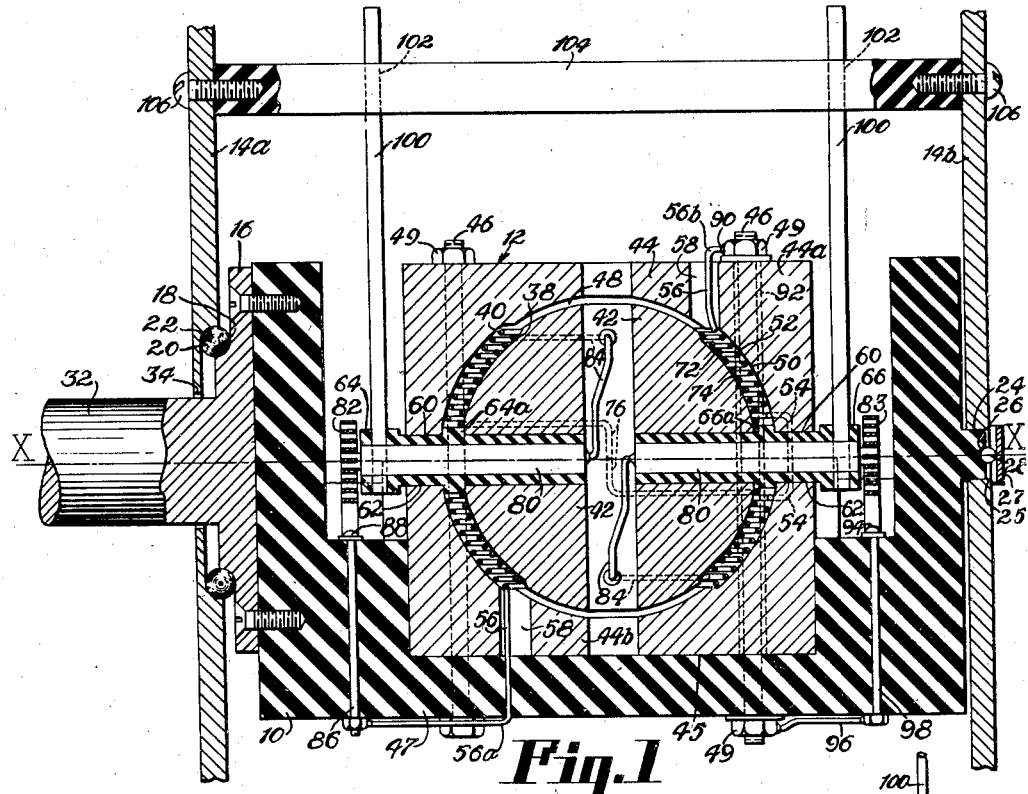
Fig. 1 is an enlarged cross-section through a variometer embodying the present invention.

Referring to the drawing:

The reference numeral 10 designates a substantially U-shaped cage or support of any suitable insulating material, such as Bakelite, which carries a variable inductor 12. The support 10 is rotatably mounted between metallic end plates 14a and 14b which may be held in the spaced relation shown in Fig. 1 by any suitable means, such as cross bars (not shown). More particularly, the support 10 carries at one end a disk 16 which provides one race 18 for a ball bearing 20, the other race 22 thereof being provided by the adjacent end plate 14a. The other end of the support 10 is provided with a shank 24 which is journalled in an opening 25 in the other end plate 14b. The shank 24 is provided with a conical depression 26 in which is retained by a strap 27 a steel ball 28 that acts as a thrust bearing. The disk 16 is provided with a shank 32 which projects through an opening 34 in the end plate 14a and carries a knob (not shown) with which to rotate the support 10 about the axis $x$—$x$ (Fig. 1).

The inductor 12 comprises stator coils 38 and rotor coils 40 which are carried by a ferro-magnetic stator core 42 and a ferro-magnetic rotor shell 44, respectively. More particularly, the rotor shell 44 consists of two separate halves or members 44a and 44b of which the member 44b is located in a correspondingly shaped recess 45 in the yoke 47 of the support 10 in the manner shown in Figs. 1 and 2. The shell members 44a and 44b are secured to each other as well as to the support 10 by means of a plurality of bolts 46 and nuts 49 in the manner shown in Figs. 1 and 2. Each of the shell members 44a and 44b is provided with a semi-spherical cavity (Figs. 1 and 3) which together form the spherical cavity 48 that has its center located on the axis of rotation of the support 10. The spherical wall of the cavity 48 is furthermore provided with an annular groove 50 to the spherical bottom 52 of which are suitably secured, as by cementing, the rotor coils 40. These coils are preferably space-wound and suitably connected in series with each other by conductively connecting their adjacent leads 54 in the manner shown in Fig. 1. The opposite leads 56 of the series-connected rotor coils 40 are passed to the outside of the stator shell 44 through suitable openings 58 in the stator halves 44a and 44b, respectively.

Figure 3:
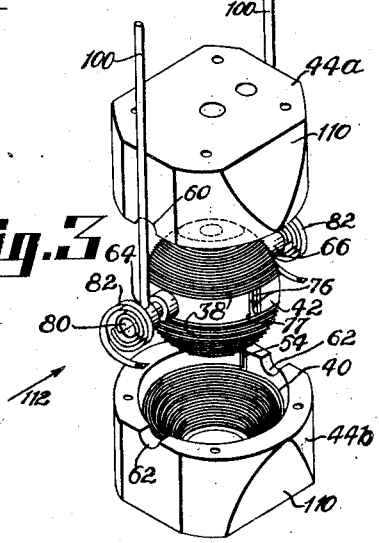
Fig. 3 is a perspective view of certain separated parts of the variometer.

Mounted for rotation about the axis of rotation of the support 10 in complementary bearing surfaces 60 and 62 of the shell halves 44a and 44b (see also Fig. 3) are two bushings 64 and 66 which are made of any suitable insulating material, such as Bakelite or hard rubber. Located centrally within the spherical cavity 48 of the stator shell 44 and suitably mounted on the insulated bushings 64, 66 is the stator core 42 which is spherical except for an annular groove 72 in its circumference to the spherical bottom 74 of which are suitably secured, as by cementing, the stator coils 38. The insulated bushings 64 and 66 are provided with collars 64a and 66a, respectively, which keep the stator core 42 equally spaced from the wall of the cavity 48 in the rotor shell 44. The stator coils are also preferably space-wound and are connected in series through their adjacent connected leads 76 which are placed in a shallow groove 77 in the periphery of the stator core 42 (Fig. 3).

Received in the insulated bushings 64 and 66 are conductors 80 which carry at their opposite ends non-inductively wound, flexible spiral connectors 82 and 83 of the type disclosed in my prior Patent No. 2,097,642, issued November 2, 1937. As best shown in Fig. 1, the opposite leads 84 of the series-connected stator coils 38 are conductively connected with the conductors 80 and, hence, with the spiral connectors 82 and 83. Likewise the opposite leads 56a and 56b of the rotor coils 40 are conductively connected with the spiral connectors 82 and 83. More particularly, lead 56a is connected at 88 with the spiral connector 82 through intermediation of a conductor 86. The other lead 56b of the series-connected rotor coils 40 is conductively connected at 90 with one of the metallic nuts 49 on one of the metallic bolts 46 which extends through a bushing 92 of insulating material in the shell members 44a, 44b The other nut 49 on the opposite end of said bolt is conductively connected at 94 with the other spiral connector 83 through intermediation of suitable conductors 96 and 98. Hence, the series-connected stator coils 38 and the series-connected rotor coils 40 are connected in parallel across the spiral connectors 82 and 83. It is to be understood, however, that the coils 38 and 40 may be connected in series with each other, if desired.

To prevent rotation of the stator core 42, metallic rods 100 are secured to the opposite ends of the insulated bushings 64, 66 and conductors 80 and are passed through holes 102 in a cross bar 104 which is of any suitable insulating material and secured to the opposite end plates 14a and 14b in any suitable manner, as by the screws 106. Thus, on rotation of the support 10 and the rotor shell 44, the stator 70 will remain stationary. Either one or both of the rods 100 may be used as terminals for connecting the variometer in an electrical circuit.

The stator core 42 and the shell members 44a and 44b are preferably molded under pressure and composed of finely divided iron particles and a suitable binder for them.

Figure 2:
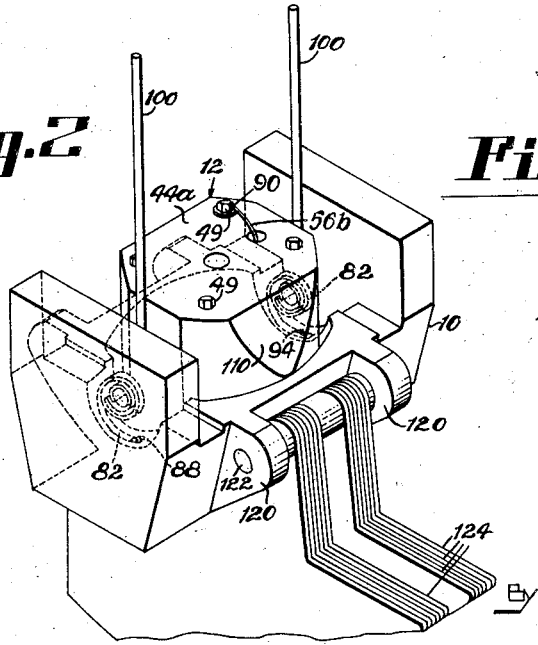
Fig. 2 is a perspective view of the variometer.

As best shown in Figs. 2 and 3, two opposite sides of the shell members 44a and 44b are externally tapered as at 110 to approach spherical shape if viewed in the direction of the arrow 112 in Fig. 3. This in conjunction with the invariable air gap between the stator core 42 and the cavity wall of the rotor shell 44 causes the reluctance of the variometer to be substantially constant.

The ferro-magnetic stator core and the ferro-magnetic rotor shell 44 form together a magnetic path which is closed except for the very narrow, invariable air gap therebetween, wherefore when the relatively rotatable coils are in the position of maximum coupling a maximum flux linkage between the relatively rotatable coils is obtained. The result thereof for this position of the coils is a high maximum inductance for the variometer. When, however, the coils are in the position of maximum opposition and minimum inductance, measurement shows that the ferro-magnetic stator core and the ferro-magnetic rotor shell are substantially without effect upon the inductance of the variometer. As a result of the large increase in inductance of the variometer when the coils are in the position of maximum coupling, and the absence of any effect from the ferro-magnetic core and shell when the coils are in the position of maximum opposition the inductance ratio of the variometer, i. e., the ratio of its maximum inductance to its minimum inductance, is increased to an extent which was heretofore impossible. Thus, an inductance ratio of 37 to 1 has been obtained with a model of the present variometer. This ratio is merely given as an example and not as a limitation, as higher ratios may well be obtained with specially constructed variometers of the present type.

The increase in inductance ratio of the variometer caused by surrounding the coil system with ferro-magnetic material such as the stator core and the rotor shell was a wholly unexpected effect, and not predictable from the general knowledge of the art relating to coil systems with and without surrounding ferro-magnetic material. Heretofore it has been considered that whenever an air core system of coils was partially or completely surrounded by ferro-magnetic material its inductance was increased, regardless of the arrangement or relative disposition of the coils, and this reasoning applied to the variometer would lead to the conclusion that there would be no advantage in using ferro-magnetic material, as it would merely increase the inductance by the same factor at all relative positions of the rotor and stator coils, and would therefore have no effect upon the inductance range.

It has been found by experiment that the ferro-magnetic material has little effect either upon the inductance or upon the "Q" or figure of merit of the variometer when the relatively rotatable coils are in the position of maximum opposition and minimum inductance. This fact accounts for the surprisingly high value of "Q" of this variometer when its coils are in this position, as well as its remarkable inductance range.

The large inductance range of the present variometer is an important factor in the elimination of the large number of tuning elements heretofore found necessary in all-wave radio receivers and the complex switch required for selecting the proper tuning element when desiring to tune in a chosen frequency band. Thus, one of the present variometers with its large inductance ratio, in conjunction with a suitable variable condenser, is well able to cover the entire short-wave broadcast range, the intermediate range for police and aviation broadcasts, and the American broadcast range.

A tuning condenser may be combined into one unit with the present variometer in the manner disclosed in my prior Patent No. 2,066,944 issued January 5, 1937, in which case the rotor support 10 is provided with spaced lugs 120 for supporting cross-bars 122 on which the rotor plates 124 of the condenser are stacked in the manner shown in Fig. 2.

I claim:

1. A variable inductor comprising, in combination, a plurality of conductively connected coils; a ferro-magnetic rotor shell carrying one of said coils on its internal wall; a ferro-magnetic stator core non-conductively rotatably mounted in said shell and carrying the other coil on its circumference in inductive relation with said one coil; a rotatable cage of insulating material on which said shell is mounted; and means for holding said core against rotation.

2. A variable inductor comprising, in combination, a plurality of conductively connected coils; a ferro-magnetic rotor shell member consisting of two halves secured together and carrying one of said coils on its internal wall; a ferro-magnetic stator core member in said shell member and carrying the other coil on its periphery in inductive relation with said one coil; axially aligned pivots of insulating material carried by one of said members and rotatably mounted in the other member; a rotatable cage of insulating material on which said shell member is mounted; and means for holding said core against rotation.

3. A variable inductor comprising, in combination, a plurality of conductively connected coils; a ferro-magnetic rotor shell consisting of two halves secured together and carrying one of said coils on its internal wall; a ferro-magnetic stator core in said shell and carrying the other coil on its periphery in inductive relation with said one coil; diametrically opposite pivots of insulating material carried by said core and rotatably mounted in said shell; a cage of insulating material on which said shell is mounted; a support on which said cage is rotatably mounted; and means connecting said support with at least one of said pivots to hold said core against rotation.

4. The combination in a variable inductor as set forth in claim 3, in which the stator core is provided with holes through which the leads of the stator coil are passed to the inner ends of the pivots, and said pivots are hollow and receive conductive bars with which said leads are connected.

5. The combination in a variable inductor as set forth in claim 3, in which metallic bolts extend through holes in said cage and said shell halves and receive nuts for securing said shell halves to said cage, at least one of said bolts extending through a bushing of insulating material in aligned holes of said halves and being conductively connected with a lead of the rotor coil.

6. A variable inductor comprising, in combination, a plurality of conductively connected coils; a ferro-magnetic shell member carrying one of said coils on its internal wall; a ferro-magnetic core member mounted in said shell member for relative rotation between both members and carrying the other coil on its external surface in inductive relation with said one coil; a support of insulating material on which one of said members is mounted for rotation therewith, said support being mounted for rotation about the axis of relative rotation between both members; and means for holding the other member against rotation relative to said one member.

JOHN P. PUTNAM.